(12) United States Patent
Choi et al.

(10) Patent No.: US 12,436,010 B2
(45) Date of Patent: Oct. 7, 2025

(54) ULTRASONIC FLOW METER HAVING MISSING VALUE AND OUTLIER CORRECTION FUNCTION AND METHOD OF OPERATION THEREOF

(71) Applicant: Electronics and Telecommunications Research Institute, Daejeon (KR)

(72) Inventors: Jongwoo Choi, Seoul (KR); Wan Ki Park, Daejeon (KR); Jinsoo Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 313 days.

(21) Appl. No.: 17/960,522

(22) Filed: Oct. 5, 2022

(65) Prior Publication Data
US 2023/0324210 A1    Oct. 12, 2023

(30) Foreign Application Priority Data
Apr. 6, 2022    (KR) .......................... 10-2022-0042639

(51) Int. Cl.
*G01F 1/667*    (2022.01)
(52) U.S. Cl.
CPC .................................... *G01F 1/668* (2013.01)
(58) Field of Classification Search
CPC ........... G01F 1/662; G01F 1/667; G01F 1/668
(Continued)

(56) References Cited

U.S. PATENT DOCUMENTS 3,550,426 A * 12/1970 Griffo ..................... G01F 25/10
                                                            73/1.34
4,103,293 A *  7/1978 La Forge, Jr. ..... G08B 13/2491
                                                            340/552
(Continued)

FOREIGN PATENT DOCUMENTS

JP       2014-92467        5/2014
JP       2020-180940      11/2020
(Continued)

OTHER PUBLICATIONS

Ashok et al. "Automatic Sensor Data Validation: Improving the Quality and Reliability of Rig Data" SPE 163726, Society of Petroleum Engineers Digital Energy Conference and Exhibition held in The Woodlands, TX, USA (Year: 2013).*

*Primary Examiner* — John Fitzgerald
(74) *Attorney, Agent, or Firm* — KILE PARK REED & HOUTTEMAN PLLC

(57) ABSTRACT

An ultrasonic flow meter is provided. The flow meter includes a detector that transmits a signal to a fluid and receives a signal from the fluid, a memory configured to store instructions, and a processor electrically connected to the memory and configured to execute the instructions, and when the instructions are executed by the processor, the processor calculates a first flow-rate value of the fluid using a signal transmitted to the fluid and a signal transmitted from the fluid, determines whether the first flow-rate value is missing, calculates a second flow-rate value of the fluid using a physical quantity of the fluid if the first flow-rate value is missing, and replaces the missing value with the second flow value, and the physical quantity is measured by an auxiliary sensor located installed on a pipe through which the fluid flows.

12 Claims, 3 Drawing Sheets

(58) Field of Classification Search
USPC .......................................................... 73/1.16
See application file for complete search history.

(56) References Cited

U.S. PATENT DOCUMENTS

| | | | | |
|---|---|---|---|---|
| 6,772,082 | B2 * | 8/2004 | van der Geest | G01N 33/007 |
| | | | | 702/116 |
| 7,480,577 | B1 * | 1/2009 | Feller | G01F 1/667 |
| | | | | 702/45 |
| 7,607,362 | B1 * | 10/2009 | Brost | G01F 1/08 |
| | | | | 73/202 |
| 10,655,409 | B2 * | 5/2020 | Xue | E21B 49/08 |
| 10,781,683 | B2 * | 9/2020 | Xue | E21B 44/00 |
| 2013/0124113 | A1 * | 5/2013 | van Dal | G01F 15/024 |
| | | | | 702/45 |
| 2016/0033317 | A1 * | 2/2016 | Aharoni | G01D 18/00 |
| | | | | 73/1.16 |
| 2020/0210895 | A1 | 7/2020 | Han et al. | |
| 2021/0182708 | A1 | 6/2021 | Park et al. | |
| 2023/0066279 | A1 * | 3/2023 | Kawaguchi | G01F 1/662 |

FOREIGN PATENT DOCUMENTS

| | | |
|---|---|---|
| KR | 10-2015-0043598 | 4/2015 |
| KR | 10-2020-0082893 | 7/2020 |
| KR | 10-2021-0062513 | 5/2021 |
| KR | 10-2021-0084979 | 7/2021 |
| KR | 10-2021-0098712 | 8/2021 |
| KR | 10-2288652 | 8/2021 |
| KR | 10-2321767 | 11/2021 |
| WO | WO-2010138117 A1 * 12/2010 | ........... G01F 1/8436 |

\* cited by examiner

| Time | Flow-meter measured value ▲ | Auxiliary-sensor measured value |
|---|---|---|
| 2022-01-01 13:00:05 | 0.00 | 9.51 |
| 2022-01-05 09:45:25 | 0.11 | 9.46 |
| 2022-01-02 20:17:00 | 0.56 | 9.23 |
| 2022-01-11 03:23:55 | 0.82 | 9.11 |
| ... | ... | ... |

ULTRASONIC FLOW METER HAVING MISSING VALUE AND OUTLIER CORRECTION FUNCTION AND METHOD OF OPERATION THEREOF

CROSS-REFERENCE TO RELATED APPLICATIONS

This application claims the benefit of Korean Patent Application No. 10-2022-0042639 filed on Apr. 6, 2022, in the Korean Intellectual Property Office, the entire disclosures of which are incorporated herein by reference for all purposes.

BACKGROUND

1. Field of the Invention

One or more example embodiments relate to an ultrasonic flow meter having a missing value and outlier correction function and a method of operating thereof.

2. Description of the Related Art

An ultrasonic flow meter is a device that uses ultrasonic waves to measure the flow rate of a fluid. Ultrasonic flow meters are mainly installed in pipes such as those of a building or a facility to be used for continuously monitoring the flows of the fluids in the pipes.

The ultrasonic flowmeter has an advantage of being easy to install because it may be installed by attaching a detector to the outside of the pipe. However, there may be a short-term error that results in a missing value. Moreover, the measured flow rate value may be inaccurate if bubbles or foreign materials exist within the fluid.

In case of a missing or inaccurate flow rate measurement, several imputation methods such as last observation carried forward (LOCF), extrapolation, and interpolation may be applied to replace a missing or inaccurate flow rate value with an alternative one.

The above description is information that the inventor(s) acquired during the course of conceiving the present disclosure, or already possessed at the time, and is not necessarily art publicly known before the present application was filed.

SUMMARY

Various example embodiments may enhance the accuracy and reliability of an ultrasonic flow meter by replacing a missing value in the flow rate measurement with an alternative value, which is obtained by using a physical quantity of a fluid measured from an auxiliary sensor.

Various example embodiments may generate the alternative value at a low cost by using an auxiliary sensor that is pre-installed on a pipe.

Various example embodiments may be applied to a low-end ultrasonic flow meter by simplifying an instruction that generates the alternative value for a missing and/or outlier-like value.

However, the technical aspects are not limited to the aforementioned aspects, and other technical aspects may be present.

A flow meter according to various example embodiments may include a detector that transmits a signal to a fluid and receives a signal from the fluid, a memory configured to store instructions, and a processor electrically connected to the memory and configured to execute the instructions, and when the instructions are executed by the processor, the processor may be configured to calculate a first flow-rate value of the fluid using a signal transmitted to the fluid and a signal transmitted from the fluid, determine whether the first flow-rate value is missing, calculate a second flow-rate value of the fluid using a physical quantity of the fluid if the first flow-rate value is missing, and replace the missing value with the second flow value, and the physical quantity may be measured by an auxiliary sensor installed on a pipe through which the fluid flows.

The processor may determine whether the first flow-rate value is within a valid range, calculate a third flow-rate value of the fluid using the physical quantity if the first flow-rate value is an outlier which lies outside of the valid range, and replace the outlier with the third flow-rate value.

The processor may store a first flow-rate value and a physical quantity of the fluid obtained at the same time as a data pair, search for one or more pre-stored data pairs that includes a physical-quantity similar to a physical quantity of the fluid at the time when the missing value occurs, calculate an average value of a first flow-rate values included in the data pairs, and replace the missing value with the average value.

The processor may assign a weight to a first flow-rate value included in the data pair, obtain a weighted average value of first flow-rate values included in the data pair, and replace the missing value with the weighted average value.

The processor may assign the weight differently according to the similarity between a physical quantity included in the searched data pair and a physical quantity of the fluid at the time when the missing value occurred.

The processor may assign a weight differently in proportion to the similarity.

A method of operating the flow meter according to various example embodiments may include transmitting a signal to a fluid, receiving a signal transmitted from the fluid, calculating a first flow-rate value of the fluid using a signal transmitted to the fluid and a signal transmitted from the fluid, determining whether the first flow-rate value is missing, receiving a physical quantity of the fluid from an auxiliary sensor installed on a pipe which the fluid flows, calculating a second flow-rate value of the fluid using the physical quantity if the first flow-rate value is missing, and replacing the missing value with the second flow-rate value.

The method of operating the flow meter according to various example embodiments may further include determining whether the first flow-rate value is within a valid range, calculating a third flow-rate value of the fluid using the physical quantity if the first flow-rate value is an outlier which lies outside of the valid range, and replacing the outlier with the third flow-rate value.

The method of operating the flow meter according to various example embodiments may further include storing a first flow-rate value and a physical quantity of the fluid obtained at the same time as a data pair, and searching for one or more pre-stored data pairs that includes a physical-quantity similar to a physical quantity at the time when the missing value occurs, calculating the second flow-rate value, which may include calculating an average value of a first flow-rate value included in the data pair, and replacing the missing value with the second flow-rate value, which may include replacing the missing value with the average value.

Calculating the average value may include assigning a weight to a first flow-rate value included in the data pair, and obtaining a weighted average value of first flow-rate values included in the data pair, replacing the missing value with the average value, which may include replacing the missing value with the weighted average value.

Assigning the weight may include assigning the weight differently according to the similarity between a physical quantity included in the data pair and a physical quantity of the fluid at the time when the missing value occurred.

Assigning the weight differently may include assigning the weight differently in proportion to the similarity.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figures 1, 2:
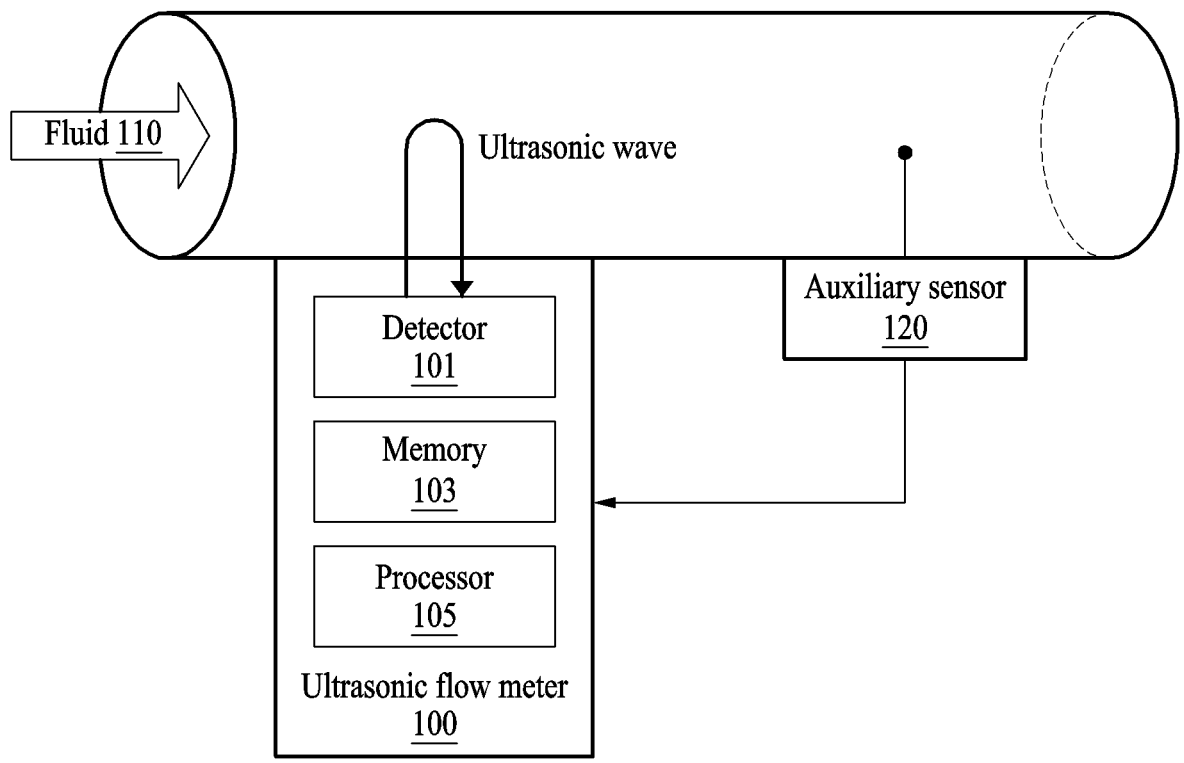
FIG. 1 is a block diagram illustrating an example of a flow meter according to various example embodiments.
FIG. 2 is a diagram illustrating an example of a data pair stored by a processor.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like elements and a repeated description related thereto will be omitted.

FIG. 1 is a block diagram illustrating an example of a flow meter according to various example embodiments.

Referring to FIG. 1, according to various example embodiments, a flow meter 100 may be a flow meter (e.g., an ultrasonic flow meter) for measuring a flow rate and/or a flow velocity of a fluid 110 flowing through a pipe. The flow meter 100 may be detached/attached to an outer surface of the pipe which the measurement target fluid 110 passes through. The flow meter 100 may include a detector 101, a memory 103, and a processor 105.

The detector 101 may transmit a signal (e.g., an ultrasonic wave) to the fluid 110 in the pipe and receive a signal (e.g., an ultrasonic wave) transmitted from the fluid 110.

The memory 103 may store instructions (e.g., a program) and data (e.g., a data pair of a flow rate of a fluid and a physical quantity of a fluid) executable by the processor 105. For example, the instructions may include instructions for executing an operation of the processor 105 and/or an operation of each component of the processor 105. The memory 103 may be implemented as a volatile memory device or a non-volatile memory device. The volatile memory device may be implemented as a dynamic random access memory (DRAM), a static random access memory (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronic memory device, and/or an insulator resistance change memory.

The processor 105 may execute computer-readable code (e.g., software) stored in the memory 103 and instructions triggered by the processor 105. The processor 105 may be a data processing device implemented with hardware having a circuit that has a physical structure for executing desired operations. The desired operations may include, for example, code or instructions included in a program. The data processing device implemented with hardware may include, for example, a microprocessor, a central processing unit, a processor core, a multi-core processor, a multiprocessor, an application-specific integrated circuit (ASIC), and a field programmable gate array (FPGA).

The processor 105 may calculate a flow velocity and/or flow rate of the fluid 110 using a signal (e.g., an ultrasonic wave) transmitted by the detector 101 to the fluid 110 in a pipe and a signal (e.g., ultrasonic wave) transmitted (e.g., reflected and transmitted) from the fluid 110. For example, the processor 105 may calculate the flow rate of the fluid 110 using a transit time of a signal transmitted to the fluid 110 and a signal transmitted from the fluid 110 or using a frequency of a signal, but is not limited thereto.

The processor 105 may receive a physical quantity (e.g., temperature and pressure) of the fluid 110 from an auxiliary sensor 120 (e.g., a sensor that is installed on a pipe of the measurement target fluid 110, such as a thermometer or manometer).

The processor 105 may determine whether the flow rate value of the fluid 110 is missing and/or whether the calculated flow rate value is within a valid range. For example, a missing value may occur if the ultrasonic wave transmitted into the pipe is lost due to a foreign material within the fluid 110.

The processor 105 may determine whether a physical quantity of the fluid 110 received from the auxiliary sensor 120 is normally received and/or whether the received physical quantity is within a valid range.

When the calculated flow rate of the fluid 110 is within a valid range and a physical quantity of the fluid 110 received from the auxiliary sensor 120 is within a valid range, the processor 105 may store them as a data pair (e.g., the data pair of FIG. 2) and output the same. For example, the data pair may be a data pair of a flow rate of the fluid 110 and temperature of the fluid 110 but is not limited thereto. The time or period at which the data pair is stored may be adjusted by a user. The processor 105 may delete an old data pair or some of the similar data pairs to secure the storage space of the memory 103.

When the calculated flow rate of the fluid 110 is within a valid range and a physical quantity received from the auxiliary sensor 120 is missing or lies outside of a valid range, the processor 105 may output only the calculated flow rate value.

When the flow rate value of the fluid 110 is missing or is an outlier which lies outside of a valid range, the processor 105 may generate a value (hereinafter referred to as an "alternative value") to replace the missing value or outlier using a physical quantity of the fluid 110 received from the auxiliary sensor 120. For example, the processor 105 may use a physical quantity (hereinafter referred to as "real-time physical quantity") received from the auxiliary sensor 120 at the time when the missing value occurs. For example, the processor 105 may search for one or more pre-stored data pairs that includes a physical quantity similar to a real-time physical quantity and generate an alternative value using flow rate values included in the one or more data pairs. For example, the processor 105 may assign a weight to a flow rate value included in the data pair considering the similarity of the physical quantity, calculating a weighted average value, and output the weighted average value as an alternative value. This may be expressed as equation 1:

$$w_i = \frac{|x_i - x|}{\sum_{i=1}^{n}|x_i - x|} \quad \bar{y} = \sum_{i=1}^{n} w_i y_i$$

Here, each parameter may be as follows.

$x_i$: physical quantity of a fluid included in a data pair
$x$: real-time physical quantity
$w_i$: weight
$y_i$: a flow rate of a fluid included in a data pair
$\bar{y}$: weighted average value FIG. 2 is a diagram illustrating an example of a data pair stored by a processor.

Referring to FIG. 2, a processor (e.g., the processor 105 of FIG. 1) may store a flow rate (e.g., the flow rate calculated by using the detector 101) of a fluid (e.g., the fluid 110 of FIG. 1) and a physical quantity (e.g., the physical quantity measured by the auxiliary sensor 120 of FIG. 1) of the fluid 110 that is normally obtained at the same time as a data pair. The time or period at which the data pair is stored may be adjusted by a user (e.g., an operator).

Figure 3:
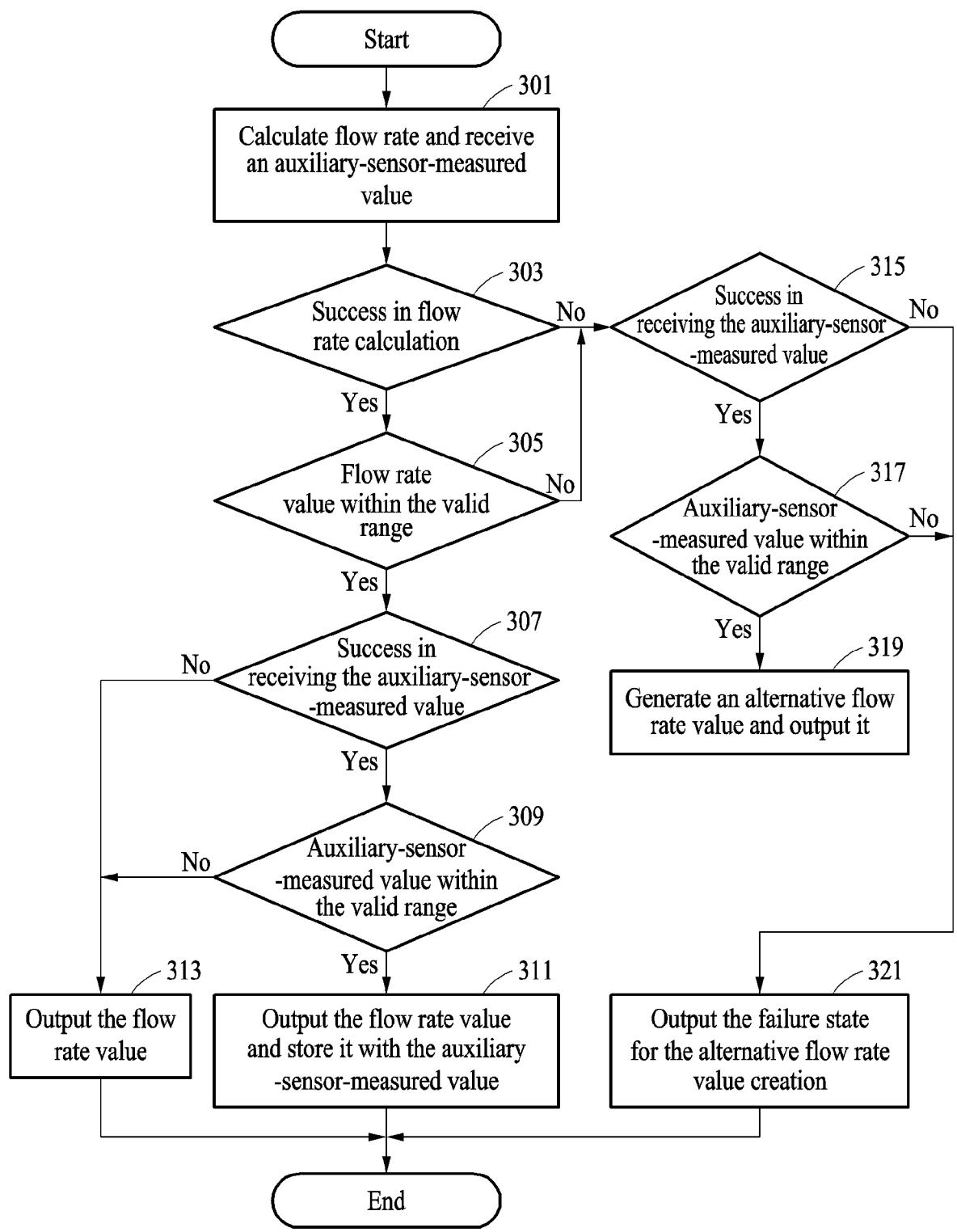
FIG. 3 is a flowchart illustrating a method of operating a flow meter according to various example embodiments.

FIG. 3 is a flowchart illustrating a method of operating a flow meter according to various example embodiments.

In operation 301, a flow meter (e.g., the flow meter 100 of FIG. 1) may calculate a flow rate of a fluid (e.g., the fluid 110 of FIG. 1) and receive a physical quantity (e.g., temperature and pressure) of the fluid 110 from an auxiliary sensor (e.g., the auxiliary sensor 120 of FIG. 1).

In operation 303, the flow meter 100 may determine whether the flow rate value of the fluid is missing. For example, a missing value may occur if the ultrasonic wave transmitted into the pipe is lost due to a foreign material within the fluid.

In operation 305, when there is the calculated flow rate value, the flow meter 100 may determine whether the calculated flow rate value is within a valid range.

In operation 307, when the calculated flow rate value is within a valid range, the flow meter 100 may determine whether a real-time physical quantity measured by the auxiliary sensor 120 has been received.

In operation 309, when there is a real-time physical quantity received from the auxiliary sensor 120, the flow meter 100 may determine whether the received physical quantity is within a valid range.

In operation 311, when the calculated flow rate value is within a valid range and the received real-time physical quantity is within a valid range, the flow meter 100 may store the flow rate and the real-time physical quantity of the fluid as a data pair (e.g., the data pair of FIG. 2) and output the same.

In operation 313, when the calculated flow rate is within a valid range and the real-time physical quantity is missing or lies outside of a valid range, the flow meter 100 may only output the calculated flow rate value.

In operation 315, when the calculated flow rate is missing or lies outside of a valid range, the flow meter 100 may determine whether a real-time physical quantity measured by the auxiliary sensor 120 exists.

In operation 317, when there is a real-time physical quantity, the flow meter 100 may determine whether the real-time physical quantity is within a valid range.

In operation 319, when the real-time physical quantity is within a valid range, the flow meter 100 may generate an alternative value using the real-time physical quantity. A method of generating the alternative value will be described in detail with reference to FIG. 4.

In operation 321, when a real-time physical quantity is missing or lies outside of a valid range, the flow meter 100 may output the failure state for the alternative value creation.

Figure 4:
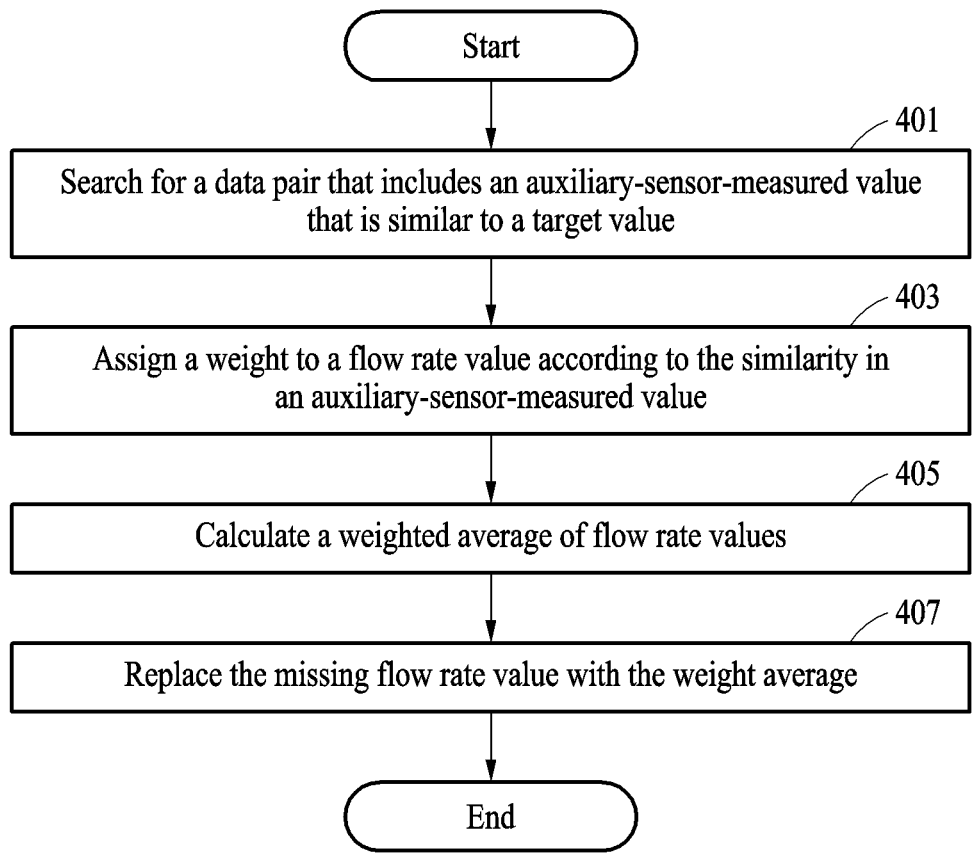
FIG. 4 is a flowchart illustrating a method of generating an alternative value for a flow meter according to various example embodiments.

FIG. 4 is a flowchart illustrating a method of generating an alternative value of a flow meter according to various example embodiments.

In operation 401, the flow meter 100 may search for one or more pre-stored data pairs (e.g., the data pair stored in operation 311 of FIG. 3) that includes a physical quantity similar to a real-time physical quantity. The number of data pairs may be changed by a user (e.g., an operator). The flow meter 100 enhance its accuracy and reliability by generating an alternative value in real-time using the pre-stored data pair.

In operation 403, the flow meter 100 may assign a weight to a flow rate value included in the data pair. For example, the flow meter 100 may assign a weight (e.g., the weight of equation 1) to the flow rate value included in the data pair in proportion to the similarity between a real-time physical quantity and a physical quantity included in the data pair.

In operation 405, the flow meter 100 may obtain an average value of the flow rate value included in the data pair.

For example, the flow meter 100 may obtain an average value (e.g., the weighted average value of equation 1) of flow rate values with the consideration for the assigned weight.

In operation 407, the flow meter 100 may output the average value calculated in operation 405 as an alternative value.

Since the algorithm of operations from 401 to 407 for generating an alternative value is relatively simple, it may be applied to a low-end flow meter.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A flow meter comprising:
a detector that transmits a signal to a fluid and receives a signal from the fluid;
a memory configured to store instructions; and
a processor electrically connected to the memory and configured to execute the instructions,
wherein,
when the instructions are executed by the processor, the processor is configured to
calculate a first flow-rate value of the fluid using a signal transmitted to the fluid and a signal transmitted from the fluid, determine whether the first flow-rate value is missing, calculate a second flow-rate value of the fluid using a physical quantity of the fluid if the first flow-rate value is missing, and replace the missing value with the second flow value,
wherein
the physical quantity is configured to
be measured by an auxiliary sensor installed on a pipe through which the fluid flows.

2. The flow meter of claim 1, wherein
the processor is configured to
determine whether the first flow-rate value is within a valid range, calculate a third flow-rate value of the fluid using the physical quantity if the first flow-rate value is an outlier which lies outside of the valid range, and replace the outlier with the third flow-rate value.

3. The flow meter of claim 1, wherein
the processor is configured to
store a first flow-rate value and the physical quantity of the fluid obtained at the same time as a data pair; and
search for one or more pre-stored data pairs that includes the physical quantity similar to the physical quantity of the fluid at the time when the missing value occurs, calculate an average value of first flow-rate values comprised in the searched data pair, and replace the missing value with the average value.

4. The flow meter of claim 3, wherein
the processor is configured to
assign a weight to a first flow-rate value comprised in the searched data pair, calculate a weighted average value of first flow-rate values comprised in the searched data pair, and replace the missing value with the weighted average value.

5. The flow meter of claim 4, wherein
the processor is configured to
assign the weight differently according to the similarity between the physical quantity included in the searched data pair and the physical quantity of the fluid at the time when the missing value occurred.

6. The flow meter of claim 5, wherein
the processor is configured to
assign the weight differently in proportion to the similarity.

7. A method of operating the flow meter comprising:
transmitting a signal to a fluid;
receiving a signal transmitted from the fluid;
calculating a first flow-rate value of the fluid using a signal transmitted to the fluid and a signal transmitted from the fluid;
determining whether the first flow-rate value is missing;
receiving a physical quantity of the fluid from an auxiliary sensor installed on a pipe through which the fluid flows;
calculating a second flow-rate value of the fluid using the physical quantity if the first flow-rate value is missing; and
replacing the missing value with the second flow-rate value.

8. The method of claim 7, further comprising:
determining whether the first flow-rate value is within a valid range;
calculating a third flow-rate value of the fluid using the physical quantity if the first flow-rate value is an outlier which lies outside of the valid range; and
replacing the outlier with the third flow-rate value.

9. The method of claim 7, further comprising:
storing a first flow-rate value and the physical quantity of the fluid obtained at the same time as a data pair; and
searching for one or more pre-stored data pairs that includes the physical quantity similar to the physical quantity at the time when the missing value occurs,
wherein
calculating the second flow-rate value comprises:
calculating an average value of a first flow-rate value comprised in the searched data pair,
wherein
replacing the missing value with the second flow-rate value comprises:
replacing the missing value with the average value.

10. The method of claim 9, wherein
calculating the average value comprises:
assigning a weight to a first flow-rate value comprised in the searched data pair; and
obtaining a weighted average value of a first flow-rate value comprised in the searched data pair,
wherein
replacing the missing value with the average value comprises:
replacing the missing value with the weighted average value.

11. The method of claim 10, wherein
assigning the weight comprises:
assigning the weight differently according to the similarity between the physical quantity included in the data pair and the physical quantity of the fluid at the time when the missing value occurred.

12. The method of claim 11, wherein
assigning the weight differently comprises:
assigning the weight differently in proportion to the similarity.

* * * * *